Sept. 9, 1924.
P. L. ALGER
1,508,152

SQUIRREL CAGE WINDING FOR ALTERNATING CURRENT MOTORS

Filed May 4, 1922

Inventor:
Philip L. Alger,
by Albert G. Davis
His Attorney

Patented Sept. 9, 1924.

1,508,152

UNITED STATES PATENT OFFICE.

PHILIP L. ALGER, OF SCHENECTADY, NEW YORK, ASSIGNOR TO GENERAL ELECTRIC COMPANY, A CORPORATION OF NEW YORK.

SQUIRREL-CAGE WINDING FOR ALTERNATING-CURRENT MOTORS.

Application filed May 4, 1922. Serial No. 558,409.

To all whom it may concern:

Be it known that I, PHILIP L. ALGER, a citizen of the United States, residing in Schenectady, county of Schenectady, State of New York, have invented certain new and useful Improvements in Squirrel-Cage Windings for Alternating-Current Motors, of which the following is a specification.

My invention relates to alternating current motors and more particularly to alternating motors provided with one or more squirrel cage windings on their rotor elements.

Various expedients have been resorted to in the construction of squirrel cage rotors both in the synchronous and asynchronous types of motors with a view of obtaining the most desirable starting and operating characteristics. These characteristics have been obtained in many instances by sacrificing or without regard to the most desirable mechanical construction. It is the object of my invention to improve the mechanical construction of the rotor element of such motors without sacrificing to any extent the desirable starting and operating characteristics found in commercial alternating current motors. The improvements in mechanical design contemplated by the present application include the simplest possible mechanical construction which will permit of a wide variation in the electrical constants of the squirrel cage with a slot of standard dimensions.

Figure 1:
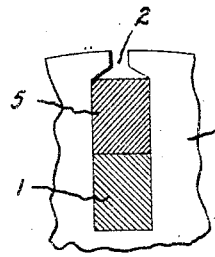
Figure 2:
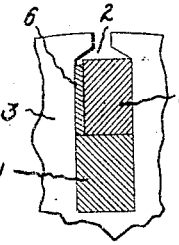
Figure 3:
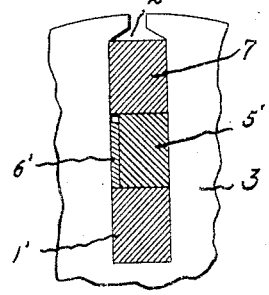
Figure 4:
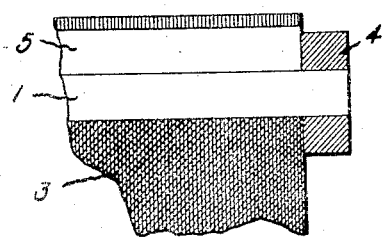
Figure 5:
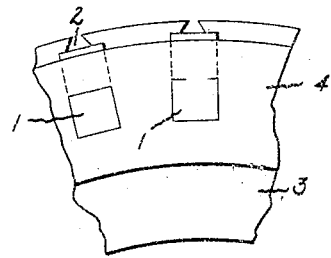
Figure 6:
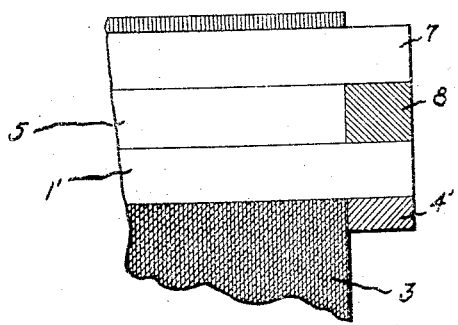
Figure 7:
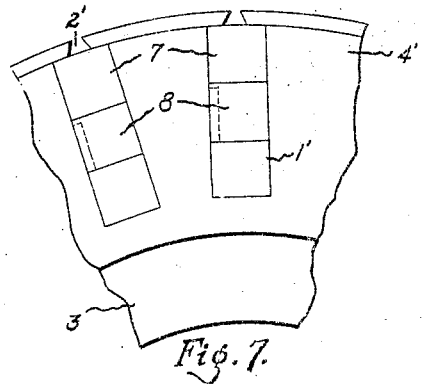

The features of my invention which I believe to be novel and patentable will be pointed out in the claims appended hereto. The details of construction thereof will now be explained in connection with the accompanying drawings in which Figs. 1 and 2 represent cross sections of squirrel cage structures more particularly adapted for synchronous motors. Fig. 3 illustrates a cross section of a double squirrel cage induction motor rotor; Figs. 4 and 6 represent sections taken on the slot edge of Figs. 1 and 3, respectively, showing the end ring structure; and Figs. 5 and 7 represent end views of Figs. 4 and 6, respectively.

Referring now more in particular to Figs. 1, 2, 4 and 5, 1 represent rectangular squirrel cage bars placed in the bottom of straight edge rectangular slots 2 punched in the laminations 3 and having overhanging retaining portions at the periphery thereof. The squirrel cage bars are connected to end rings, one of which is shown at 4, in any well known manner. Above the squirrel cage bars there are placed rectangular bars 5 preferably of steel. These bars lie on top of the squirrel cage bars and completely fill up the space between the squirrel cage and the narrow openings of the slots. The steel bars 5 are prevented from working out endwise by the end rings 4 which are of sufficient depth to form retaining rings for the steel bars 5.

This simple, rugged construction readily lends itself to wide variations in the electrical constants of the squirrel cage winding without changing the dimensions of the slots. Thus it will be evident without further illustration that if a higher resistance squirrel cage is desired, I may decrease the depth of bars 1 and increase the depth of bars 5 and that if a lower resistance squirrel cage is desired, I may increase the depth of bars 1 and decrease the depth of bars 5. I might also insulate bars 5 from the squirrel cage or I might weld them together and vary the conductance of the squirrel cage in this manner. Furthermore, the reactance of the squirrel cage may be varied while using the same size slots by varying the width of the magnetic bridge formed by bars 5. Thus in Fig. 2 I have decreased the width of bar 5 and filled up the remaining space by a wedge 6 of any suitable material such as copper or horn fibre. It will be evident that the wedge 6 will be retained in place against radial and endwise movements in the same manner as described in connection with bars 5. The width of the bridge may be still further decreased by providing an additional wedge on the other side of the slot shown in Fig. 2. Furthermore, the reactance might be changed without changing the width of the slots or the resistance of the squirrel cage by decreasing the depth of the magnetic bridges above the squirrel cage and inserting similar but narrower bars beneath the squirrel cage. It will be evident from an inspection of Figs. 4 and 5 that all such bars and wedges will be prevented from endwise movements by the end rings 4. Again, the electrical characteristics of the squirrel cage winding may be varied to some extent by making the bridges 5 and wedges 6 of different materials. With a magnetic bridge 5 and a copper wedge 6 a certain amount of eddy currents will be produced therein. The eddy currents may be varied by varying the conductivity of the members 4 and 5. Thus, I might laminate the magnetic bridge 5 in a direction to decrease eddy currents therein without varying the reactance of the squirrel cage.

The dimensions of the parts shown in Figs. 1, 2, 4 and 5 are particularly designed for obtaining the most desirable compromise between the starting torque, pull-in torque and mechanical characteristics in a synchronous motor provided with a squirrel cage winding. Such a motor would be provided with fixed polar projections having direct current field windings thereon with a squirrel cage winding in the periphery of the projections. Figs. 1, 2, 3 and 4 may represent sections of the periphery of such a rotor. The characteristics of a synchronous motor provided with the squirrel cage structure of Fig. 2 will be as follows: At starting, line frequency currents flow in the squirrel cage winding making a line frequency flux across the slots through bars 5 and wedges 6. As the bars 5 are made of solid metal, circulating currents will be set up therein which will flow across the top of the bars and back along the bottom, in such a way as to oppose the passage of the flux. These currents will make losses which will produce torque just as truly as the actual copper losses in the squirrel cage winding produces torque. Thus the effect of a solid steel pole is secured at starting without the disadvantage of pole face losses at full speed ordinarily incurred by solid pole construction. At full speed the currents in the squirrel cage winding are small and of low frequency and consequently the flux will no longer cross the magnetic bridge formed by bars 5 but will flow down through the pole in the usual way. Thus, relatively low resistance running and high resistance starting characteristics of the squirrel cage are obtained. The current carrying conductors of the squirrel cage winding are not subjected to excessive heating because the losses at starting occur almost entirely in the steel bars 5. The effect of a minimum depth of slot is obtained because all the space above the current carrying conductors is utilized for carrying flux, whereas in a double squirrel cage construction a part of the valuable space in the top of the slot is used for carrying a high resistance bar of considerable depth. It will thus be evident that such a construction has the desirable characteristics of the usual double squirrel cage winding. In the construction of squirrel cage windings of synchronous motors it is an advantage to make the resistance of the squirrel cage bars lying in the central portion of the pole piece less than the resistance of those bars at the edges of the pole pieces. In the form of winding above described this desirable feature may be readily obtained without the necessity of using different size slots.

Although the rectangular slot and bar construction is the more desirable from the point of view of mechanical construction, the shape of the bars is immaterial in so far as the electrical characteristics of the motor are concerned, and it will therefore be evident that the last mentioned aspect of my invention is not limited to any particular shape of the bars or slots.

Referring now to Figs. 3, 6 and 7, I have illustrated the mechanical features of my invention applied to an ordinary double squirrel cage induction motor rotor in which the rotor is provided with rectangular partially closed slots 2' containing a double squirrel cage winding consisting of bars 1' in the bottom of the slots, bars 7 in the top of the slots and the common end rings 4'. These parts will be made of some good conducting material such as copper, brass or aluminum although they need not necessarily all be made of the same material. Between these windings is placed a solid rectangular bar 5', preferably of steel, and a wedge 6', preferably of copper, or horn fibre. The parts are adapted to completely fill the slots and the bars 5' and wedges 6' are prevented from working out endwise by plugs 8 in the end rings. Ordinarily, the end rings will be provided with an opening extending the full depth of the three bars 1', 5' and 7 and after the parts are assembled, that portion 8 between the two squirrel cage bars will be filled in at the same time the end rings are secured to the squirrel cage bars, such, for example, as by welding or brazing. This provides a simple, rugged, double squirrel cage structure the electrical characteristics of which may be readily changed without changing the dimensions of the slots or end rings. Thus, the relative resistances of the two squirrel cages may be changed by changing the relative depth of the bars 1' and 7. The desired reactance of the lower squirrel cage may be obtained by varying the relative width of the magnetic bridge 5' and the wedge 6'. I do not consider that the production of eddy currents in bars 5' will be of any appreciable amount or that such currents will be of any particular advantage in a double squirrel cage structure such as illustrated in Figs 3, 6 and 7.

It will be evident that a motor with the features hereinbefore described will be advantageous from a manufacturing point of view because only one size and type of rotor punchings and end rings are required for manufacturing motors of different characteristics, the desired characteristics being obtained by changing the dimensions and arrangement of the bars placed in the slots.

In accordance with the provisions of the patent statutes, I have described the principle of operation of my invention, together with the apparatus which I now consider to represent the best embodiment thereof: but I desire to have it understood that the apparatus shown is only illustrative and that the invention may be carried out in various ways.

What I claim as new and desire to secure by Letters Patent of the United States, is:—

1. An alternating current motor rotor provided with rectangular slots in the peripheral portions thereof, a squirrel cage winding comprising rectangular bars in said slots and end rings at the extremities of said rotor and rectangular magnetic wedges in said slots above said bars abutting against said end rings.

2. An alternating current motor rotor provided with rectangular partially closed slots in the peripheral portions thereof, a squirrel cage winding comprising bars in said slots and end rings at the extremities of said rotor and bridges above said bars in said slots comprising rectangular bars of magnetic and non-magnetic material, said bridge members abutting against said end rings.

3. An alternating current motor comprising cooperating stator and rotor members, said rotor member comprising a cylindrical laminated core provided with rectangular partially closed slots in its periphery, a plurality of squirrel cage windings having common end rings and having rectangular bars in each of said slots at different radial depths therein and rectangular bars of magnetic material between said squirrel cage bars abutting against said end rings.

4. An alternating current motor comprising cooperating stator and rotor elements, said rotor element consisting of a cylindrical laminated core with rectangular partially closed slots in its periphery, a double squirrel cage winding having bars in each of said slots and bridges between said squirrel cage bars comprising rods of magnetic and non-magnetic material of such relative dimensions as to produce the desired flux path between said squirrel cage windings, said squirrel cage bars and bridge rods completely filling the rectangular portions of said slots.

5. An alternating current motor comprising cooperating stator and rotor elements, said rotor elements comprising a laminated structure provided with slots in its peripheral portions, a squirrel cage winding having conducting bars in the bottoms of said slots and a bridge member above said bars in said slots consisting of rods of magnetic and non-magnetic materials placed side by side, the relative dimensions of said rods being such as to give the squirrel cage winding any desired reactance within the limits of the structure.

In witness whereof, I have hereunto set my hand this 3rd day of May, 1922.

PHILIP L. ALGER.